United States Patent
Nakabayashi et al.

(10) Patent No.: US 6,367,785 B1
(45) Date of Patent: Apr. 9, 2002

(54) AIR DAMPER

(75) Inventors: Isao Nakabayashi; Seiji Sawatani, both of Yokohama (JP)

(73) Assignee: Piolax, Inc., Yokohama (JP)

( * ) Notice: Subject to any disclaimer, the term of this patent is extended or adjusted under 35 U.S.C. 154(b) by 0 days.

(21) Appl. No.: 09/684,526

(22) Filed: Oct. 6, 2000

(30) Foreign Application Priority Data

Oct. 8, 1999 (JP) .......................................... 11-287550

(51) Int. Cl.$^7$ ................................................ B60R 7/06
(52) U.S. Cl. ............................ 267/71; 267/226; 267/34
(58) Field of Search .......................... 267/69, 70, 71, 267/72, 73, 74, 75, 34, 226; 16/66

(56) References Cited

U.S. PATENT DOCUMENTS

| | | | | | |
|---|---|---|---|---|---|
| 1,135,372 A | * | 4/1915 | Gibson | ..................... | 267/71 |
| 2,298,611 A | * | 10/1942 | Bruderlin | ..................... | 74/512 |
| 2,856,077 A | * | 10/1958 | Stanton | ..................... | 267/71 |
| 4,807,655 A | * | 2/1989 | Robertson | ..................... | 135/22 |
| 4,955,309 A | * | 9/1990 | Ciccone | ..................... | 267/70 |
| 4,976,433 A | * | 12/1990 | Pohlenz et al. | ............. | 476/534 |
| 5,333,845 A | * | 8/1994 | Seiichi | ..................... | 267/71 |
| 5,694,879 A | * | 12/1997 | Taylor | ..................... | 267/74 |
| 5,906,173 A | * | 5/1999 | Day, Jr. et al. | ............. | 114/294 |
| 6,220,583 B1 | * | 4/2001 | Ito | ..................... | 267/71 |

FOREIGN PATENT DOCUMENTS

| EP | 0344611 A2 | * 12/1989 | |
|---|---|---|---|
| JP | 2557064 | 8/1997 | ............. B60R/7/08 |

* cited by examiner

*Primary Examiner*—Matthew C. Graham
*Assistant Examiner*—Robert A. Siconolfi
(74) *Attorney, Agent, or Firm*—Howard & Howard

(57) ABSTRACT

A tubular cylinder has a first end and a second end. A piston is movable in the cylinder. A compressed coil spring resiliently biases the piston toward the first end of the cylinder. A string transmits a damper function, caused by a movement of the piston, to a body to be moved. The string slideably wraps over the piston, and extends the length of the cylinder.

10 Claims, 5 Drawing Sheets

AIR DAMPER

BACKGROUND OF THE INVENTION

1. Field of the Invention

The present invention relates to improvement of a cylinder-type air damper to be employed, for example, in a glove box of an automobile.

2. Description of Relevant Art

In Japanese Utility Model Registration Publication No. 2557064 a conventional air damper is disclosed.

The typical air damper is composed of a tubular cylinder have two open ends, a piston which is connected to an end of a string for moving in the cylinder, a valve device which is installed at one end of the cylinder for controlling a passing amount of air, a guide cap which is installed at the other end of the cylinder for guiding the string, and a compressed coil spring which is interposed between the guide cap and the piston in the cylinder.

SUMMARY OF THE INVENTION

This conventional air damper has the advantage of ensuring smooth opening or closing motion of a glove box. One disadvantage of the typical air damper is that the amount of the string that can be pulled out of the cylinder is limited to the travel distance of the piston in the cylinder. Thus, when used in a place where the cylinder cannot have a large length there is the disadvantage of a very short damper stroke.

An object of the invention is to provide an air damper which allows a longer damper stroke even in an installment with a reduced cylinder space.

In a first aspect of the present invention, there is provided an air damper as follows. In the air damper, a tubular cylinder has a first end and a second end. A piston is movable in the cylinder. A compressed coil spring resiliently biases the piston toward the first end of the cylinder. A string transmits a damper function caused by a movement of the piston to a movable body connected to one end of the string. The string is wrapped partially around the piston and extends the length of the cylinder.

Preferably, the string has a first end fixed to a portion of the body that is movable relative to an air damper body, and a second end fixed to the air damper body or an unmovable portion of the air damper body.

Preferably, the air damper further includes a separating plate at the second end of the cylinder as an entrance and exit for the string. The string extends along both sides of the separating plate.

Preferably, the piston has a hook body formed with a hook wall having a closed annular shape around which the string passes and the piston rotatably supports the hook body.

Preferably, the cylinder is provided with an installment piece fixed to the cylinder, and a second end of the string is provided with a clip, which is engaged with the installment piece and is fixed to the installment piece.

In a second aspect of the present invention, there is provided an air damper as follows. The damper includes a longitudinal cylinder with a first end and a second end; a piston longitudinally movable in the cylinder; and a string which passes over the piston in the cylinder and extends longitudinally along the cylinder.

Preferably, the air damper further includes a spring, which biases the piston toward the first end of the cylinder.

Preferably, the air damper further includes a separating plate at the second end of the cylinder and each end of the string passes along a side of the separating plate.

Preferably, the piston has a rotatably mounted hook body. The string is passed over the hook body.

According to the invention, the movable string passes over the piston, and, compared to conventional dampers, even in a small-sized air damper designed according to the present invention, the amount of the string that can be pulled out of the cylinder is much longer, thus providing the necessary damper stroke.

The first end of the string is fixed to a part that moves relative to the air damper body and the second end is fixed to the air damper body or a part that does not move relative to the air damper body, so that, compared to a typical damper, even in a small-sized air damper designed according to the present invention, the amount of the string that can be pulled out of the cylinder is longer, thus providing the necessary damper stroke.

The separating plate is provided at a second end of the cylinder as an entrance and exit for the string, so that a twist of the string outside the cylinder is prevented from spreading to inside the cylinder, and a twist in the cylinder is adjusted by pulling the string.

The string passes over the closed annular hook wall of the hook body, so that the string cannot come off the hook body, and the hook body rotates relative to the piston to further effectively adjust a twist of the string in the cylinder.

The second end of the string is provided with a clip, and thus the second end of the string is easily connected to an installment piece on a side of the cylinder.

DETAILED DESCRIPTION OF THE PREFERRED EMBODIMENT(S)

A preferred embodiment of the present invention will be hereby explained with reference to the drawings.

Figure 1:
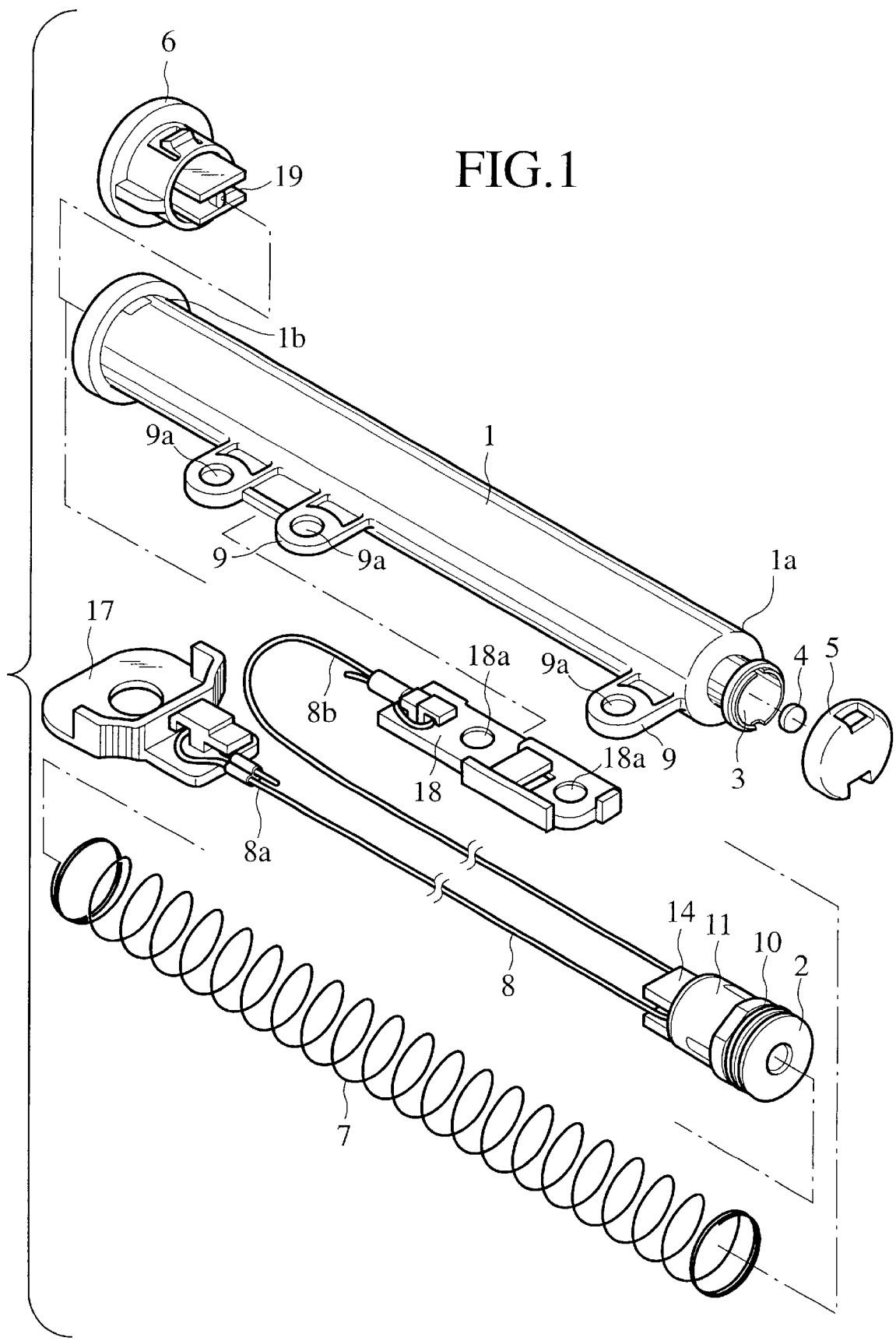
FIG. 1 is an exploded perspective view of an air damper of an embodiment according to the invention

As shown on FIG. 1, an air damper is composed of: a tubular cylinder 1 with a first open end 1a opposite a second open end 1b; a piston 2 movable in the cylinder 1; an end cap 5 with a valve 4 for opening or closing a through hole 3, for controlling air pressure, which is opened at first end 1a of the cylinder 1; a guide cap 6 for guiding movement of a string 8, as will be described later, at the second end 1b of the cylinder 1; a compressed coil spring 7 is interposed between the guide cap 6 and the piston 2 for resiliently biasing the piston 2 toward the first end 1a of the cylinder 1; and the string 8 is for transmitting a damper function caused by a movement of the piston 2 to a body that is to be moved such as a glove box. These parts constitute an air damper body.

The cylinder 1 has installment pieces 9 with screwed holes 9a longitudinally extending integrally at respective outer surfaces close to the first end 1a and the second end 1b thereof. Particularly, the double installment piece 9 adjacent the second end 1b is to be engaged with a second clip 18 which is fixed to a second end 8b of the string 8 as will be described later, thus to be fixed to a portion of the cylinder 1 with the second clip 18.

Figure 2:
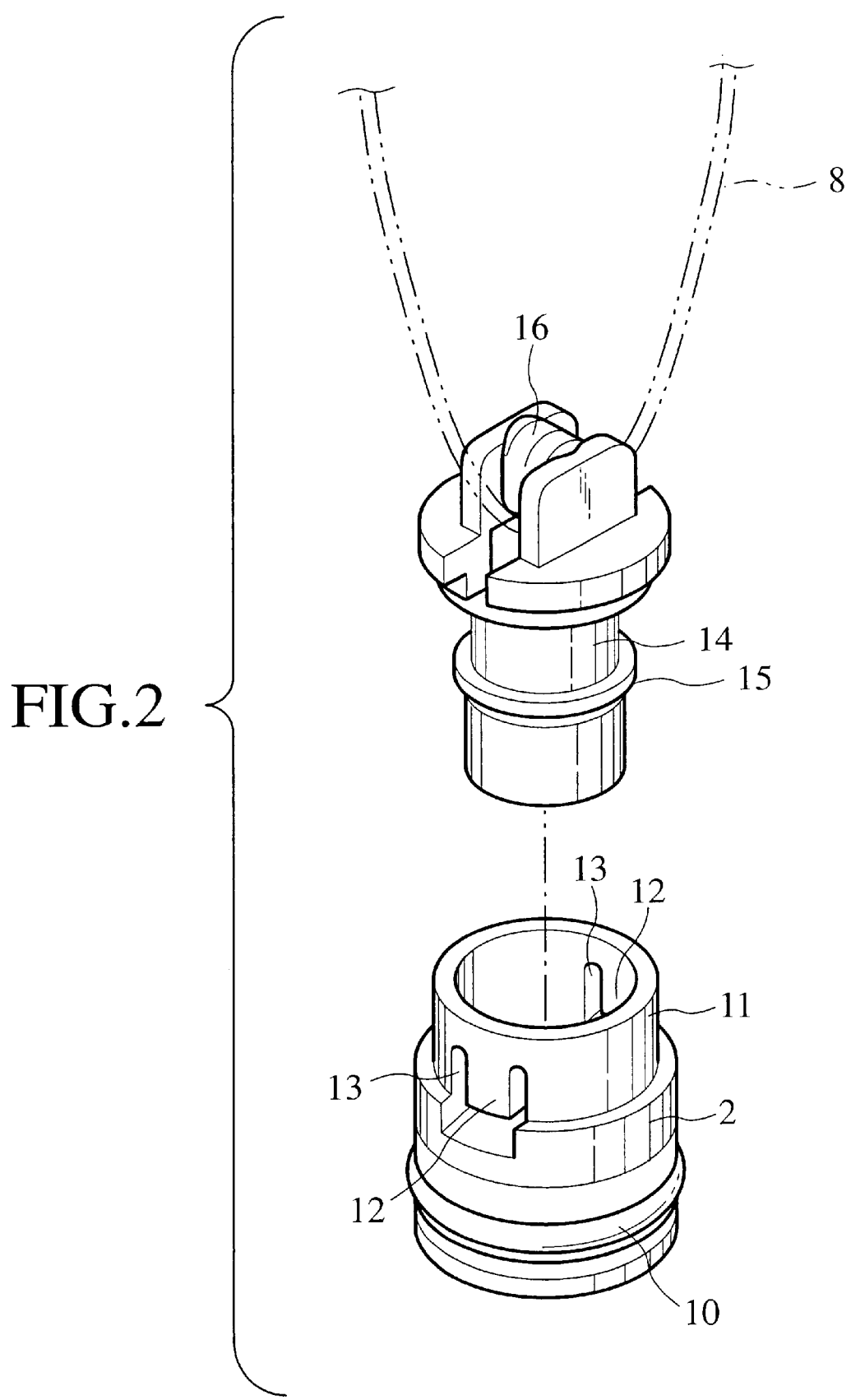
FIG. 2 is an exploded perspective view showing the relationship between a piston and a hook body.

The piston 2 has an O-ring 10 fitted in a circumferential face thereof. As shown on FIGS. 2 and 3, on a side to be combinedly used as an installment seat of the coil spring 7, it has a tubular connecting part 11 extending integrally therewith. The tubular connecting part 11 has a pair of resilient locking pawls 12 formed on opposed sidewalls via a pair of slits 13. With the connecting part 11, the locking pawls 12 engage into a locking state, and a hook body 14, to be described later, is rotatably supported in connecting part 11 and retained by locking pawls 12.

Figure 3:
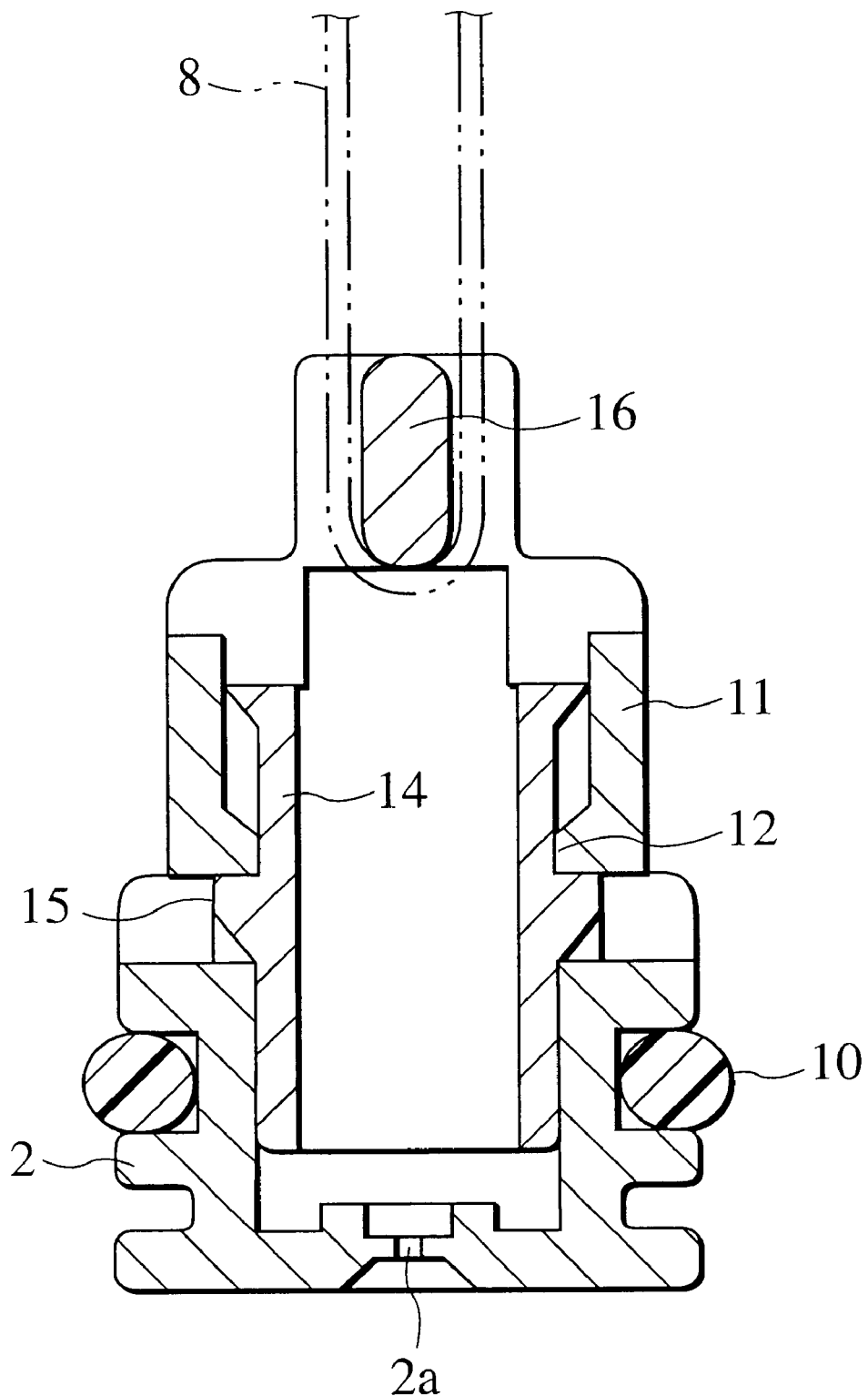
FIG. 3 is a sectional view showing the hook body rotatably supported in the piston.

The hook body 14, as shown on the FIG. 3, has a cylindrical shape with a hollow inside part. It has an annular projection 15 formed at a central part thereof for engaging with the locking pawls 12 to rotatably lock hook body 14 into connecting part 11. It has a closed annular hook wall 16 formed on a rear end for passing a folded portion of the string 8 to be moved over the hook wall 16. Thus, the piston 2 is slideably engaged by string 8.

The string 8 to be moved is applied over the hook wall 16 of the hook body 14, thus being folded or extending, in a longitudinal direction of the cylinder 1. A first end 8a thereof is secure to a first clip 17, which is to be fixed to a side face of a glove box of, for example, of an automobile. A second end 8b thereof is secured to a second clip 18 to be engaged with the installment piece 9 adjacent second end 1b. Particularly, the second clip 18 has a pair of screwed holes 18a to be engaged with the above-described installment piece 9 and corresponds to the screwed hole 9a of the installment piece 9.

Figure 4:
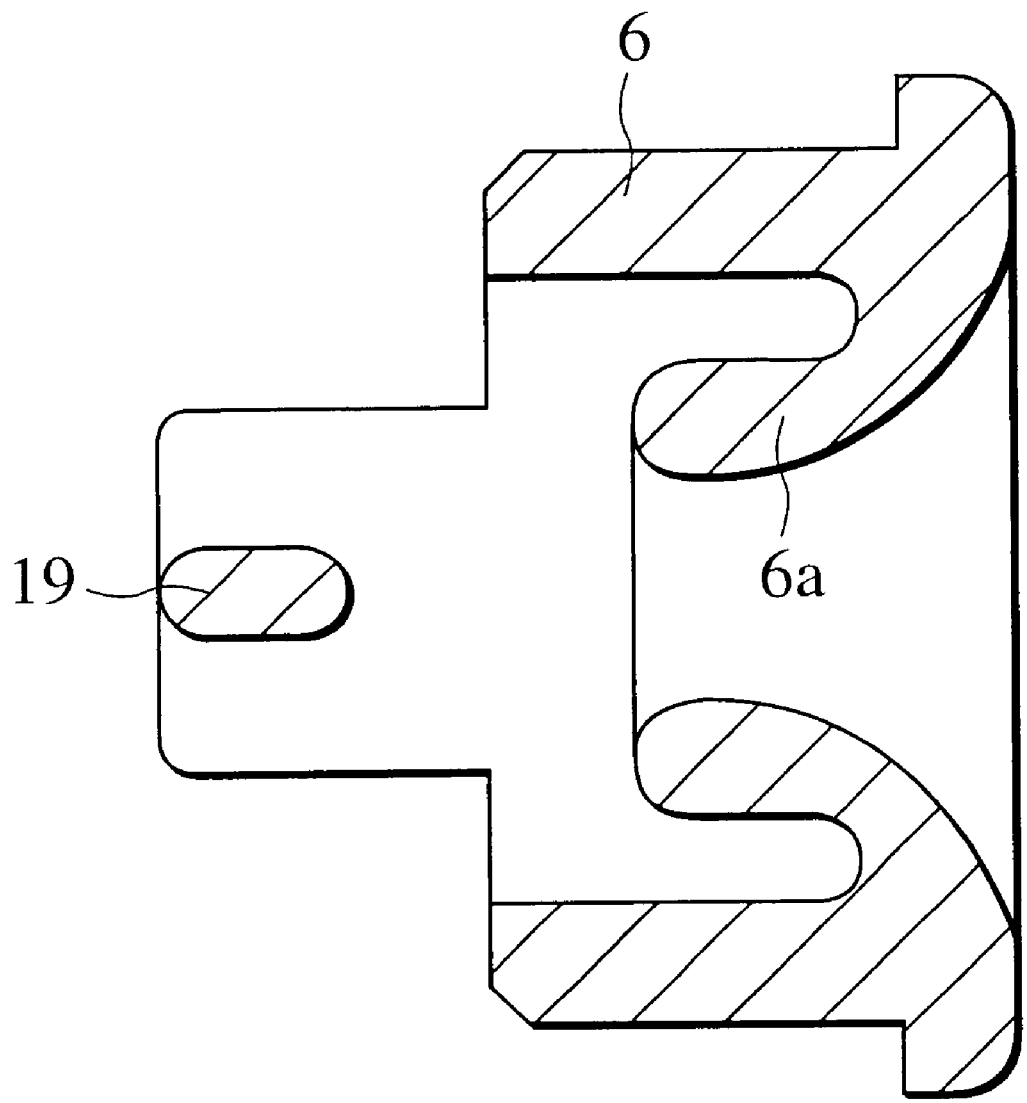
FIG. 4 is a cross sectional view of a guide cap.
Figure 5:
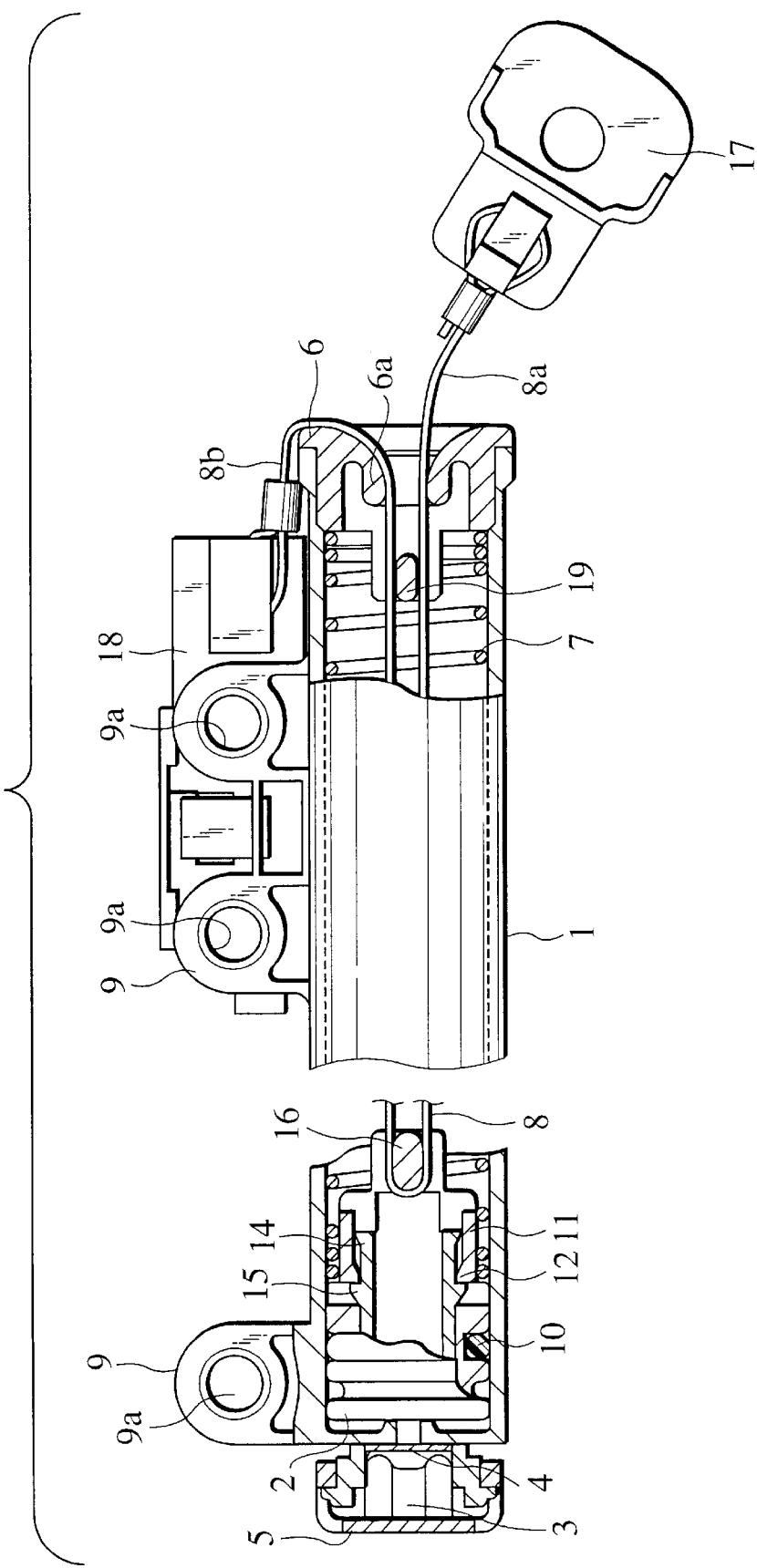
FIG. 5 is a front view partially broken away showing an assembled air damper.

The guide cap 6 is fitted into the second end 1b of the cylinder 1 and, as shown on FIG. 4, has an arc-shaped guide face 6a for guiding the string 8. A separating plate 19 is provided integral to guide cap 6, and the string 8 extends along both sides of the separating plate 19 as shown in FIG. 5.

When assembling the air damper first, the string 8 is applied over the hook wall 16 configured in a closed annular shape, the string 8 being folded. The hook body 14 is then fitted into the tubular connecting part 11 of the piston 2, and the piston 2 is pushed into the cylinder 1 with the coil spring 7. While pulling the first end 8a and the second end 8b of the folded string 8 through the guide cap 6, the guide cap 6 is fitted into the second end 1b of the cylinder 1. The first end 8a of the string 8 is secured to the first clip 17 and the second end 8b of the string 8 is secured to the second clip 18. The second clip 18 is engaged with the installment piece 9 of the cylinder 1 adjacent second end 1b, and, as shown on FIG. 5, the air damper is easily assembled.

In the case of employment for a glove box of an automobile, in the same conventional manner, the cylinder 1 is fixed to an instrument panel side by screwing its installment piece 9 adjacent second end 1b and the second clip 18, not specifically shown in the Figs., into an instrument panel. While pulling the first end 8a of the string 8 extending from the guide cap 6, the first end 8a is connected to a side of a glove box by the first clip 17, thus securing opening or closing motion of the glove box. In the operation for connecting to the glove box, the string 8 is wrapped around the hook wall 16 of the hook body 14 and extends longitudinally along the cylinder 1. The first end 8a of the string thus extends outside of the cylinder 1 a distance that is approximately twice as long as the travel distance of the piston 2. Thus, if it is employed for ones whose installment space for the air damper body is limited and, in addition, which require a comparatively long stroke, comparing with a conventional air damper with a longitudinal length identical to the cylinder 1, a twice longer damper stroke is obtained, so that a sufficient correspondence can be performed.

When the glove box is moved in an opening direction, the first end 8a of the string 8 is gradually pulled away from the cylinder 1, and the piston 2 is moved in the same direction against the spring pressure of the coil spring 7. As a result, by a flow resistance of air passing through an orifice 2a in piston 2, a damper effect is obtained and it is ensured that the glove box is moved slowly toward the open state.

When the glove box is moved in a closing direction, the piston 2 is pushed back into the cylinder 1 with the string 8 by the spring pressure of the coil spring 7.

Air which has been accumulated in the cylinder 1 during the opening motion is relieved from the end cap 5 to the outside through the hole 3 opened by the valve 4. Thus, the piston 2 moves quickly in the cylinder 1, and a closing motion of the glove box is accelerated.

When opening or closing the glove box, the separating plate 19 is on the second end 1b of the cylinder 1 corresponding to an entrance and exit of the string 8. A twist of the string 8 outside the cylinder 1 is prevented from spreading in the cylinder 1 and a twist of the string 8 in the cylinder 1 is adjusted by pulling the string 8. In addition, the string 8 is passed over the closed annular hook wall 16 of the hook body 14, so that the string 8 cannot be dislodged from the hook body 14 and rotating the hook body 14 relative to the piston 2 allows any twist of the string 8 in the cylinder 1 to be adjusted effectively.

In the above-described embodiment, the cylinder 1 is fixed to the instrument panel side and the first end 8a of the string 8 is connected to a side of a glove box, the glove box being a movable body. The cylinder 1 may also be fixed to the glove box side and the first end 8a of the string 8 may be connected to the instrument panel side as a peripheral portion of the glove box, according to practice. Without being connected to the installment piece 9, the second end 8b of the string 8 can be connected to a portion for fixing the cylinder 1 itself to the glove box. In addition, as shown by the embodiment, connecting the second end 8b of the string 8 to the cylinder 1 by the second clip 18 makes its connection operation much easier. The second end 8b of the string 8 can be connected to the guide cap 6 or its separating plate 19.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A damper comprising:
   a tubular member having a first end and a second end;
   a piston movable in said tubular member;
   a spring resiliently biasing said piston toward said first end of said tubular member; and
   a string for transmitting a damper function caused by a movement of said piston to a movable member, said string slideably engaging said piston and extending longitudinally through said tubular member, the string having a first end movable with said movable member relative to said damper, and said string having a second end fixed relative to said damper.

2. A damper according to claim 1, further comprising:
   a guide cap having a separating plate and located at said second end of said tubular member;

wherein said first end and said second end of said string exit said tubular member through said guide cap, and said separating plate separates said first end of said string from said second end of said string.

3. A damper according to claim 1, wherein said piston has an engagement member formed with an engagement part having a closed annular shape, said string slidable around said engagement part and said engagement member rotatably supported on said piston.

4. A damper according to claim 1, wherein said tubular member includes an installment piece fixed to said tubular member, and a second end of said string engages a clip that is fixed to said installment piece.

5. A damper comprising:

a longitudinal tubular member having a first end and a second end;

a piston longitudinally movable in said tubular member;

a spring for biasing said piston toward said first end of said tubular member; and a string slideably engaging said piston in said tubular member, and extending longitudinally through said tubular member, the string having a first end fixed relative to said tubular member, the string having a second end movable relative to said tubular member, said second end for pulling said piston against said spring toward said second end of said tubular member.

6. A damper according to claim 5, further comprising:

a separating plate located at said second end of said tubular member, said separating plate separating said first end and said second end of said string from each other.

7. A damper according to claim 5, wherein said piston has an engagement member rotatably mounted to said piston and said string slideably engages said engagement member.

8. A damper according to claim 5, wherein said piston has an orifice longitudinally formed therethrough.

9. A damper according to claim 8, wherein said orifice has a fluid passing therethrough toward said first end of said tubular member for generating a fluid resistance when said string pulls said piston toward said second end of said tubular member.

10. A damper according to claim 8, wherein said tubular member has a valve closing said first end of said tubular member, and said valve to be opened for discharging a fluid between said first end of said tubular member and said piston therefrom when said spring biases said piston to be moved toward said first end of said tubular member.

* * * * *